United States Patent [19]

Okado et al.

[11] Patent Number: 5,604,071
[45] Date of Patent: Feb. 18, 1997

[54] TONER FOR DEVELOPING ELECTROSTATIC IMAGE

[75] Inventors: Kenji Okado, Yokohama; Ryoichi Fujita; Tsuyoshi Takiguchi, both of Kawasaki, all of Japan

[73] Assignee: Canon Kabushiki Kaisha, Tokyo, Japan

[21] Appl. No.: 393,041

[22] Filed: Feb. 23, 1995

Related U.S. Application Data

[63] Continuation of Ser. No. 913,018, Jul. 14, 1992, abandoned.

[30] Foreign Application Priority Data

| Jul. 16, 1991 | [JP] | Japan | 3-199903 |
| Jul. 30, 1991 | [JP] | Japan | 3-211340 |
| Jul. 31, 1991 | [JP] | Japan | 3-213053 |
| Jun. 26, 1992 | [JP] | Japan | 4-191415 |

[51] Int. Cl.$^6$ .................................. G03G 9/08
[52] U.S. Cl. .................................. 430/110; 430/137
[58] Field of Search .................. 430/110, 137, 430/125

[56] References Cited

U.S. PATENT DOCUMENTS

| 2,221,776 | 11/1940 | Carlson | 95/5 |
| 2,297,691 | 10/1942 | Carlson | 95/5 |
| 2,618,552 | 11/1952 | Wise | 95/1.9 |
| 2,874,063 | 2/1959 | Greig . | |
| 3,909,258 | 9/1975 | Kotz | 96/112 |
| 4,061,503 | 12/1977 | Berger et al. | 106/300 |
| 4,943,506 | 7/1990 | Demizu et al. | 430/109 |
| 5,192,637 | 3/1993 | Saito et al. | 430/110 |

FOREIGN PATENT DOCUMENTS

| 237038 | 9/1987 | European Pat. Off. . | |
| 2537987 | 6/1984 | France . | |
| 3711922 | 10/1987 | Germany . | |
| 42-23910 | 11/1967 | Japan . | |
| 43-24748 | 10/1968 | Japan . | |
| 52-32256 | 8/1977 | Japan . | |
| 54-45135 | 4/1979 | Japan . | |
| 56-64352 | 6/1981 | Japan . | |
| 58-216252 | 12/1983 | Japan | 430/110 |
| 59-52255 | 3/1984 | Japan . | |
| 60-136755 | 7/1985 | Japan . | |
| 61-160760 | 7/1986 | Japan . | |
| 62-209539 | 9/1987 | Japan | 430/110 |
| 63-174068 | 7/1988 | Japan | 430/110 |
| 1-113767 | 5/1989 | Japan . | |
| 2-3172 | 1/1990 | Japan . | |

Primary Examiner—Christopher D. RoDee
Attorney, Agent, or Firm—Fitzpatrick, Cella, Harper & Scinto

[57] ABSTRACT

The toner for developing an electrostatic image, excellent in any environmental conditions, comprises the colorant-containing resin particles and at least one kind of fine titanium oxide powder which has been made hydrophobic by treating in an aqueous medium; the fine titanium oxide powder has an average particle diameter of from 0.001 μm to 0.2 μm and a hydrophobicity of from 20% to 80%.

22 Claims, 2 Drawing Sheets

TONER FOR DEVELOPING ELECTROSTATIC IMAGE

This application is a continuation of application Ser. No. 07/913,018 filed Jul. 14, 1992, now abandoned.

BACKGROUND OF THE INVENTION

1. Field of the Invention

The present invention relates to a toner for developing an electrostatic image in image forming processes such as electrophotography, electrostatic recording or electrostatic printing.

2. Related Background Art

It is conventionally known to form an image on the surface of a photoconductive material by an electrostatic means and then develop the electrostatic image thus formed, for which a large number of methods have been conventionally known, as disclosed in U.S. Pat. No. 2,297,691, Japanese Patent Publications No. 42-23910 and No. 43-24748 and so forth. In general, an electrostatic latent image is formed on a photosensitive member, utilizing a photoconductive material and various means, and subsequently a toner is adhered to the latent image to form a toner image corresponding to the electrostatic latent image.

Next, the toner image can be transferred to an image holding medium such as paper, followed by the fixation with heat, pressure, heat-and-pressure, or solvent vapor to obtain a copy. When the process comprises a toner-image transfer step, usually the process also comprises the step of removing the remained toner on the photosensitive member.

As developing methods in which the electrostatic latent image is visualized with a toner, there are many known methods such as the powder cloud development as disclosed in U.S. Pat. No. 2,221,776, the cascade development as disclosed in U.S. Pat. No. 2,618,552, the magnetic brush development as disclosed in U.S. Pat. No. 2,874,063, and a method using a conductive magnetic toner as disclosed in U.S. Pat. No. 3,909,258.

As the toners for these developing methods, a fine powder obtained by dispersing a colorant in a thermoplastic resin followed by pulveration are commonly used. As the thermoplastic resin, polystyrene resins are widely used. In addition polyester resins, epoxy resins, acrylic resins, urethane resins, etc. are also used. As the colorant, carbon black is most widely used. In the magnetic toners, black magnetic powders of an iron oxide type are widely used. In a system using a two-component type developer, the toner is usually mixed with carrier particles such as glass beads, iron powder or ferrite particles.

The toner image finally formed on an image bearing medium such as paper or transparent film for overhead projectors (hereinafter "OHP film") is permanently fixed onto the image bearing medium by the action of heat, pressure or heat-and-pressure, of which heat fixation has been widely used.

In recent years, a rapid development is in progress from monochromatic copying to full-color copying, and two-color copying machines and full-color copying machines have been studied for practical use. For example, in Journal of Electrophotographic Society, Vol. 22, No. 1 (1983) and ibd. Vol. 25, No. 1, p. 52 (1983) reports relating to color reproduction and gradation reproduction can be found.

The formation of color images in full-color electrophotography uses three-color toners, yellow, magenta and cyan, corresponding to the three primary colors for all color reproduction.

In a method used therefor, first, the light reflecting from an original is passed through a filter which can transmit only specific color ray complementary to the toner color, and an electrostatic latent image is formed on a photoconductive layer. Next, a toner image is transferred on an image bearing medium (or image-receiving medium) through development and transfer steps. This procedure is successively repeated plural times so that the subsequent toner images are superposed on one another on the same support with registration, and thus a final full-color image is obtained through a one-step fixation.

In general, when a so-called two-component type developer comprising a toner and a carrier is used in a developing system, the toner is statically charged by the friction between toner particles and the carrier to the desired level of triboelectricity and charge polarity, and then the electrostatic image is developed with the toner utilizing the electrostatic attraction force. Hence, in order to obtain a good visible image, it is necessary for the toner to have a good triboelectric chargeability which is mainly determined by the relation with the carrier.

Nowadays, to cope with the problems as stated above, research has been done on the materials that constitute developers, for example, research on new materials for carrier core agents and carrier coat agents, as well as the optical amount of them, studies on charge control agents and fluidity-providing agents that are added to toners, and also improvements in binders that serve as mother materials.

For example, Japanese Patent Publication No. 52-32256 discloses a technique in which a charging aid such as chargeable fine particles is added to a toner. Japanese Laid-Open Patent Application No. 56-64352 discloses use of a fine resin powder having a polarity oposite to the toner. Japanese Laid-Open Patent Application No. 61-160760 discloses a technique in which a fluorine-containing compound is added to a developer so that stable triboelectric chargeability can be achieved.

Various proposals are also made on how to add the aforesaid charging aids. For example, it is a common method to make the charging aids attach on the surfaces of toner particles by the action of electrostatic force between toner particles and the charging aid or by van der Waals force, etc. In that instance, a stirrer, a mixer or the like is used. In this method, however, it is not easy to uniformly disperse additive particles onto toner particle surfaces, and free additive particles not adhered to the toner particle surfaces tend to agglomerate on one another, so that it is difficult to eliminate the presence of free additive particles. This tendency becomes more pronounced as the electrical resistivity of the charging aid increases and the particle diameter decreases. In such instances, the performance of toner is affected. For example, the quantity of triboelectricity is liable to be unstable causing non-uniform image density and fogged images, and when copies are continuously taken, the content of the charging aid changes making it impossible to maintain the initial-stage image quality.

As an alternative addition method, the charging aid is previously added together with a binder resin and a colorant when toners are prepared. However, it is difficult to uniformly disperse the charge control agent and it is the charging aid or charge control agent present near the surface of toner particle that can contribute to the chargeability and those present inside of the particles do not contribute to the chargeability. Hence it is not easy to control the amount of the charging aid to be added or the dispersed quantity on particle surfaces. Even in toners prepared by such a method, the quantity of triboelectricity is unsteady, and it is not easy to obtain toners having satisfactory developing performance as stated above.

It has been proposed in Japanese Patent Applications Laid-open No. 59-52255 and No. 60-136755 to use a toner containing hydrophobic titanium oxide. In Japanese Laid-Open Patent Application No. 59-52255, a proposal is made on a toner containing titanium oxide treated with a gaseous alkyltrialkoxysilane. Although the addition of titanium oxide certainly brings about an improvement in electrophotographic performances, further improvement has been sought, because titanium oxide inherently has a low surface activity, and coalescence of particles may occur at the stage of treatment or the powder can not be made uniformly hydrophobic.

Moreover, in recent years, there is an increasing demand for making copying machines have a higher precision and higher image quality. In the technical field, it is attempted to acheive high image quality in color copying by making toner particle diameters smaller.

When the particle diameter of toner particles becomes smaller, the surface area per unit weight increases, tending to bring about an excessive triboelectricity of the toner. This is accompanied with a possibility of the insufficient image density or the deterioration after running. In addition, because of the large triboelectricity of the toner, toner particles have strong mutual attraction force which may result in a low fluidity causing problems in steady toner feeding or in the impartment of triboelectricity to the fed toner.

The color toner such as the yellow toner, the magenta toner or the cyan toner contains no conductive material such as a magnetic material or carbon black. Hence the toner has no part from which triboelectric charge leaks, it tends to have an excessively large quantity of triboelectricity. This tendency is particularly pronounced when a polyester type binder having a high triboelectric chargeability is used as a binder resin of the toner.

In color toners for full-co/or image reproduction, following properties are strongly desired.

(1) On fixing, toner particles must be in an almost completely molten state, to such an extent that their shapes are no longer recognisable so that the fixed toner may not interfere with color reproduction not irregularly reflecting light.

(2) Color toners must have a transparency so that an upper toner layer may not interfere with the color tone of the lower toner layer having a different tone.

(3) Color toner must have well balanced hue and spectral reflection characteristics and a satisfactory chroma.

Nowadays, polyester type resins are widely used as binder resins for color toners. In general toners containing the polyester type resins tend to be affected by temperature and humidity and tend to cause problems such as an excessively large quantity of triboelectricity in an environment of low humidity or an excessively small quantity of triboelectricity in an environment of high humidity. Thus, it is intently sought to provide a color toner and a developer which have a stable quantity of triboelectricity in a wide range of environment.

SUMMARY OF THE INVENTION

An object of the present invention is to provide a toner for developing an electrostatic image, that has solved the problems as discussed above.

Another object of the present invention is to provide a toner for developing an electrostatic image, that does not tend to be influenced by environments such as temperature and humidity and always has a stable triboelectric chargeability.

Still another object of the present invention is to provide a toner for developing an electrostatic image, that can form a fog-free, sharp image and has a superior running stability.

The above objects of the present invention can be achieved by a toner for developing an electrostatic image, comprising colorant-containing resin particles and at least one fine inorganic powder which has been made hydrophobic by treating in an aqueous medium; said fine organic powder having an average particle diameter of from 0.001 μm to 0.2 μm and a hydrophobicity of from 20% to 80%.

DESCRIPTION OF THE PREFERRED EMBODIMENTS

Figure 1:
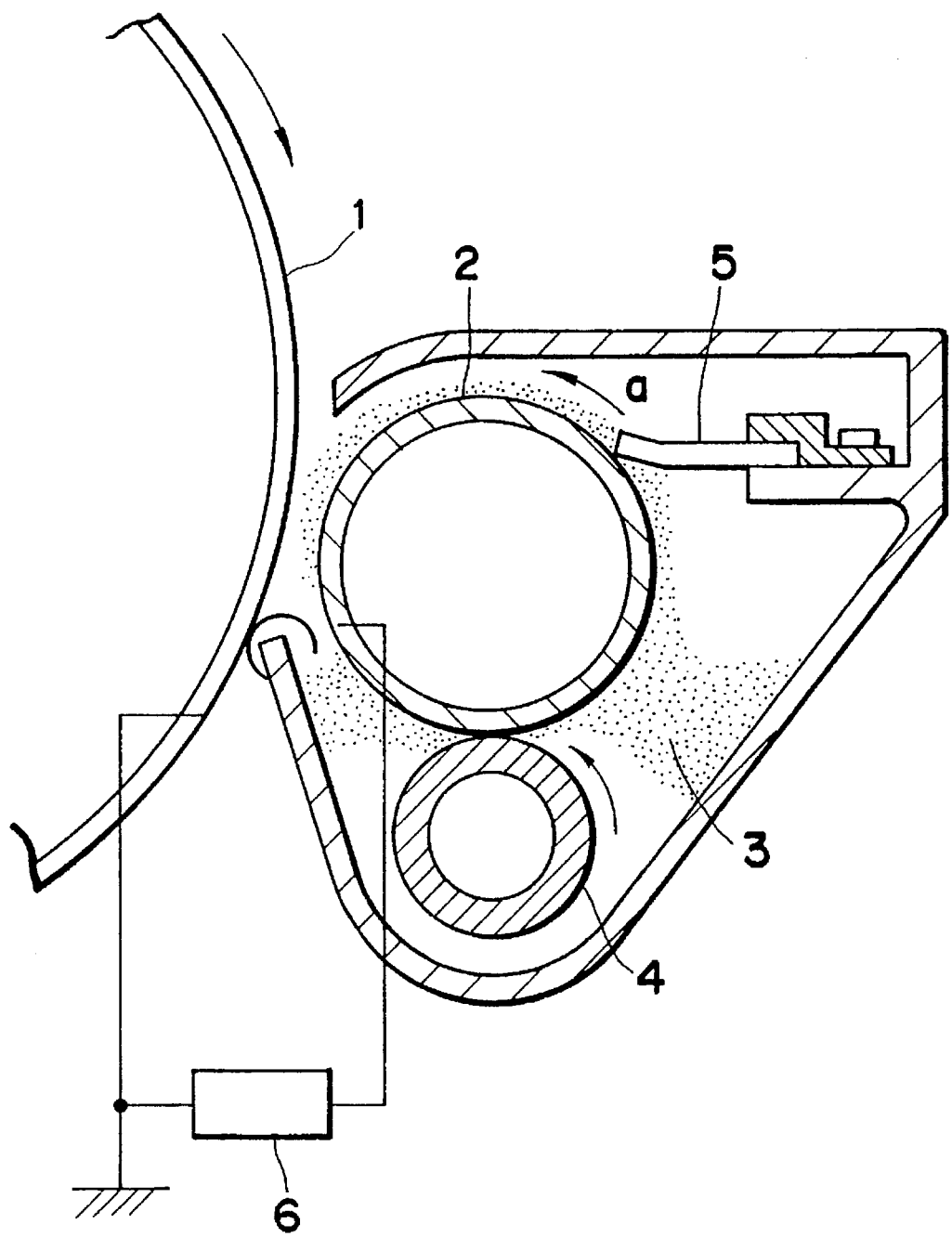
FIG. 1 illustrates an example of a developing apparatus to which the toner of the present invention can be applied.

Studying the hydrophobic treatment of fine titanium oxide powder and improvements in triboelectric charge stability and fluidity of toners, the present inventors have discovered that a hydrophobic treatment of fine titanium oxide powder in an aqueous medium can make the powder homogeneously hydrophobic and cause little, if any, coalescence between particles. They also have discovered that a toner containing titanium oxide made hydrophobic in an aqueous medium is excellent in stable triboelectric chargeability and fluidity.

As the fine titanium oxide powder to be made hydrophobic, it is preferred to use a fine titanium oxide powder having an average particle diameter of from 0.001 to 0.1 μm.

It is particularly preferred to use a hydrophilic fine titanium oxide powder synthesized by low-temperature oxidation of a titanium alkoxide.

Specifically stated, the hydrophilic fine titanium oxide powder may preferably be a titanium oxide synthesized from a titanium alkoxide by low-temperature oxidation carried out at 600° C. or below, and preferably from 250° C. to 400° C., because they have a sharp particle size distribution and a high sphericity. The above titanium oxide may preferably have a residual organic component present in an amount of from 0.05 to 2.5% by weight, because the presence of the residual organic component effects the hydrophobic treatment in an aqueous medium. The residual organic component can be controlled to be within the above range by the temperature at which starting materials are oxidized in a gaseous phase.

The titanium alkoxide may specifically include titanium tetramethoxide, titanium tetraethoxide, titanium tetrapropoxide, titanium tetrabutoxide and diethoxytitanium oxide.

When fine titanium oxide particles are surface-treated during dispersing them in an aqueous medium they become mechanically into primary particles. Hence, compared with treatment in a gaseous phase, fine titanium oxide particles do not tend to undergo coalescence, and in addition, charge repulsion action between particles enables good surface treatment of the fine titanium oxide particles substantially in the state of primary particles.

A treating agent usable in the present invention may include materials such as a coupling agent, a silicone oil, a silicone varnish and an organic compound.

The coupling agent preferably used in the present invention may include a silane coupling agent and a titanium coupling agent. The silane coupling agent may preferably include a compound represented by the formula:

wherein R represents an alkoxyl group; m represents an integer of 1 to 3; Y represents a hydrocarbon group such as an alkyl group, a vinyl group, a glycidoxy group or a methacryl group; and n represents an integer of 1 to 3. The compound can be exemplified by vinyltrimethoxysilane, vinyltriethoxysilane, γ-methacryloxypropyltrimethoxsilane, vinyltriacethoxsilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-hexadecyltrimethoxysilane, and n-octadecyltrimethoxysilane.

The particulary preferable silane coupling agent may be an alkyltrialkoxysilane represented by the formula:

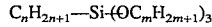

wherein m represents an integer of 1 to 3 and n represents an integer of 4 to 12.

The silane coupling agent may be used in an amount of 1 to 40 parts by weight, and preferably from 3 to 30 parts by weight, based on 100 parts by weight of fine titanium oxide particles.

The silicone oil usable in the present invention may include a dimethylpolysiloxane type silicone oil represented by the formula:

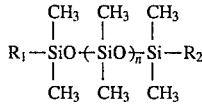

wherein $R_1$ and $R_2$ represents $CH_3$ or OH, and n represents an integer;

a methylhydrogenpolysiloxane type silicone oil represented by the formula:

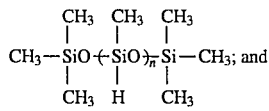

a methylphenylpolysiloxane type silicone oil represented by the formula:

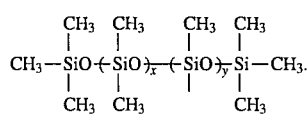

The silicone oil may further optionally be alkyl-modified, amino-modified, epoxy-modified, epoxy-polyether-modified, carboxyl-modified, mercapto-modified, alcohol-modified or fluorine-modified.

The above silicone oil may preferably have a viscosity of from 50 to 1,000 cSt at 25° C. A viscosity less than 50 cSt is not preferable since the volatile component is too much to maintain the effect of treatment over a long period of time. A viscosity more than 1,000 cSt is not preferable since it becomes difficult to carry out the treatment in the aqueous phase making the treatment less effective.

The silicone varnish usable in the present invention may also preferably have a viscosity of from 50 to 1,000 cSt at 25° C.

The silicone oil or silicone varnish in the present invention should preferably be used in an amount of from 1 to 40 parts by weight, and preferably from 2 to 30 parts by weight, to 100 parts by weight of titanium oxide in solid content ratio.

The organic compound usable in the present invention may include alcohols and fatty acids. Fatty acid compounds are particularly preferably to be used, including stearic acid compounds as exemplified by stearic acid metal salts such as sodium stearate, oleic acid compounds as exemplified by oleic acid metal salts such as sodium oleate, and palmitic acid compounds as exemplified by palmitic acid metal salts such as sodium palmitate.

In the present invention, the fine titanium oxide powder treated in an aqueous medium may be further treated in a gaseous phase. This is more preferable for improving the performances of the fine titanium oxide powder. For example, the fine titanium oxide powder having been treated in an aqueous medium (pretreated titanium oxide) may be treated with a coupling agent (a silane coupling agent) in a gaseous phase. This treatment is carried out in order to block using the coupling agent the functional groups of titanium oxide that remain after the treatment in an aqueous medium. To our surprise, the reactivity with the coupling agent is very high, when the fine titanium oxide powder has been once treated in an aqueous medium. The reason therefor is, though not clear at present, presumed that, because of the organic treatment previously carried out in an aqueous medium, the moieties other than the reactive groups of the coupling agent become highly compatible with the moieties of lipophilic groups of the fine titanium oxide particles so that the reactivity between them becomes higher. Thus, in the present invention, the coupling agent can be selected from a vast range of agents from those with a low viscosity to those with a high viscosity. This is very effective for the designing of a toner in the capability of providing charge performance and fluidity.

The silane coupling agent used in the second stage treatment in a gaseous phase may preferably include compounds represented by the formula:

wherein R represents an alkoxyl group or a chlorine atom; m represents an integer of 1 to 3; Y represents a hydrocarbon group such as an alkyl group, a vinyl group, a glycidoxy group or a methacryl group; and n represents an integer of 1 to 3. The compound can be typically exemplified by dimethyldichlorosilane, trimethylchlorosilane, allyldimethylchlorosilane, hexamethyldisialzane, allylphenyldichlorosilane, benzyldimethylchlorosilane, vinyltriethoxysilane, γ-methacyloxypropyltrimethoxysilane, vinyltriacetoxysilane, divinylchlorosilane, and dimethylvinylchlorosilane.

The treatment of the pretreated fine titanium oxide powder with the silane coupling agent in a gaseous phase is carried out by dry treatment, that is, making the pretreated fine titanium oxide powder into a cloud with stirring etc. and making the cloud react with a vaporized silane coupling agent. The silane coupling agent should preferably be used in an amount of from 1 to 20 parts by weight, and more preferably from 3 to 10 parts by weight, to 100 parts by weight of the pretreated fine titanium oxide powder.

When the silicone oil or silicone varnish is used in the first aqueous phase treatment, the second stage treatment may preferably be carried out, using a silane coupling agent represented by the formula (I):

wherein m represents an integer of 1 to 3 and n represents an integer of 4 to 12, in a gaseous phase in an acidic or basic atmosphere.

The first stage, the primary treatment using the silicone oil or silicone varnish, prevents the formation of coalescent particles due to agglomeration, and thereafter the hydrophilic functional groups remaining on the fine titanium oxide particle surfaces are blocked with the coupling agent. Hence, it is possible to obtain fine titanium oxide particles free from agglomerates and uniformly hydrophobic. In general, the gaseous phase treatment is carried out at a high temperature because of the low reactivity of alkoxysilane, in addition it has been also discovered that the presence of an acid or a base makes the hydrophobic treatment proceed at much higher efficiency.

It is presumed that the coupling treatment carried out in the acidic or basic atmosphere can effect the following (i) to (iii), and thus enables the efficient hydrophobic reaction. (i) The treatment increases the rate of hydrolysis of the coupling agent, so that (ii) a highly active intermediate silyl ester is formed between the coupling agent and the acid to accelerate the coupling reaction (see scheme II shown below) or (iii) the hydrophilic functional groups are activated by the base to accelerate the coupling reaction (see scheme III shown below).

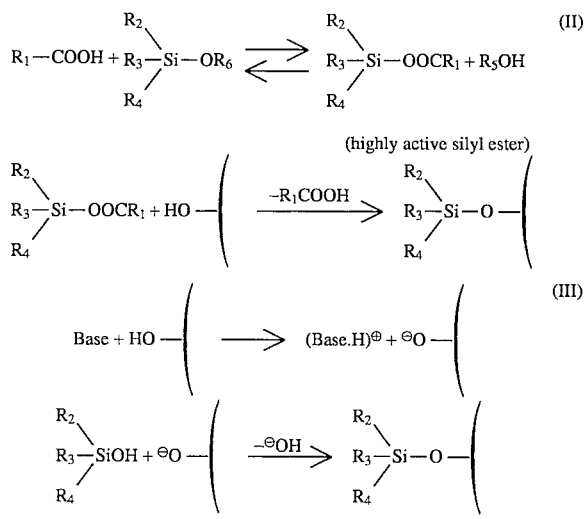

Moreover, this coupling treatment requires no step of solvent removal after the coupling treatment and the fine titanium oxide particles do not tend to agglomerate, providing fine titanium oxide particles having light transmittance.

In the coupling agent used in the present invention, n in the formula (I) should be 4 to 12, and preferably 6 to 10, and m should be 1 to 3, and preferably 1 or 2.

If n in the formula that represents the coupling agent is less than 4, the treatment can be carried out with ease, but it is difficult to obtain satisfactory hydrophobicity. If n is more than 13, a satisfactory hydrophobicity can be obtained, but coalescence of titanium oxide particles may occur lowering the fluidity providing properties.

If m is more than 3, the reactivity may be lowered and the powder can not be made sufficiently hydrophobic with ease.

The silicone oil or silicone varnish used in the treatment may be in an amount of from 0.1 to 10 parts by weight, and preferably from 1 to 7 parts by weight, to 100 parts by weight of titanium oxide. The coupling agent used in the treatment may be in an amount of from 5 to 30 parts by weight based on 100 parts by weight of titanium oxide.

The acidic compound or basic compound may be a compound which becomes volatile in a temperature range in which the silicone oil or silicone varnish does not thermally decompose. In particular, as the acidic compound, an organic acid is preferred in view of its capability of forming a silyl ester. Specifically stated, the acidic compound may include formic acid, acetic acid, trifluoroacetic acid, propionic acid and derivatives thereof. The basic compound may include ammonia, methylamine, dimethylamine, trimethylamine and derivatives therof.

The titanium oxide may be treated with the silicone oil or silicone varnish dispersing titanium oxide in a aqueous medium so that they become primary particles, and after that the treated titanium oxide is collected by evaporation of the solvent or filtration, followed by coupling treatment in a gaseous phase. The coupling treatment here may be a usual dry process hydrophobic treatment.

For example, the treated titanium oxide is vigorously stirred in the presence of the acidic compound or basic compound at temperature conditions higher than the boiling point of the acidic compound or basic compound, and the coupling agent, undiluted or diluted with a suitable solvent, is added dropwise at a constant rate. Here, the acidic compound or basic compound and the coupling agent may be previously mixed and added dropwise together.

After the addition of the coupling agent, stirring is continued maintaining the temperature for some time before the completion of the coupling treatment. Alternatively, the coupling treatment may also be carried out by pneumatically conveying the treated titanium oxide, the coupling agent, the acidic compound or basic compound and water vapor in parallel flow using inert gas, into a fluidized bed reaction vessel set to a high temperature.

The fine titanium oxide powder having been made hydrophobic to be used in the toner of the present invention, should have an average particle diameter of from 0.001 to 0.2 μm, and preferably from 0.01 to 0.2 μm, considering fluidity providing properties. If the average particle diameter is larger than 0.2 μm, the toner may be non-uniformly charged because of the poor fluidity, resulting in occurrence of fogging and black spots around the line. If it is smaller than 0.001 μm, the titanium oxide particles tend to be buried in toner particle surfaces, so that the toner may easily deteriorate and the running performance may become low. This tendency is more remarkable in color toners with sharp-melt properties.

The hydrophobic fine titanium oxide powder for the toner of the present invention, should have a hydrophobicity of from 20 to 80%, and preferably from 30 to 80%.

If the hydrophobicity is less than 20%, the quantity of triboelectricity may greatly decrease after the long standing in an environment of high humidity, to cope with which a charge promotion system in the hardware side becomes necessary, resulting in the complication of the apparatus. On the other hand if the hydrophobicity is more than 80%, it makes charge control of the titanium oxide difficult, resulting in charge-up of the toner in an environment of low humidity.

The hydrophobically treated fine titanium oxide powder may preferably have the light transmittance of not less than 40% at a wavelength of 400 nm when it is dispersed in an ethanol solvent in a concentration of 0.1% by weight as solid content.

If the treated fine titanium oxide powder has poor transmittance to visible light, and used in full-color color toners, projected images of OHP may be shadowed making it difficult to obtain sharp images. agent is hydrolyzed in an aqueous medium.

The inorganic fine particles-A and -B may preferably have an average particle diameter of from 0.001 to 0.2 μm, preferably from 0.01 to 0.2 μm, and a hydrophobicity of from 20 to 80%.

Furthermore, the present inventors have discovered that the incorporation of two kinds of inorganic fine particles, A and B, both of which have been treated to obtain hydrophobicity in an aqueous medium but chargeable to opposite polarity, is very effective for stable chargeability and fluidity providing properties of the toner.

The inorganic fine particles-A and -B may preferably have an average particle diameter of from 0.001 to 0.2 μm, more preferably from 0.01 to 0.2 μm, and a hydrophobicity of from 20 to 80%.

In the present invention, it is preferable that the particle diameter (a μm) and the quantity of triboelectricity with iron powder (x μc/g) of the inorganic fine particles-A and the particle diameter (b μm) and the quantity of triboelectricity with iron powder (y μc) of the inorganic fine particles-B satisfy the relationship of $a \geq b$ and $x \geq 0 \geq y$. The charge-up of the toner of the present invention can be moderated by the addition of the inorganic fine particles-A described above.

Furthermore, the addition of the inorganic fine particles-A facilitates acceleration in the charging rise of the toner, so that a very stable charge performance from the initial stage can be achieved.

The reason therefor is still unclear. It can be presumed as follows: At the initial stage of the friction between a charge-providing member, e.g., a carrier, and the toner, the inorganic fine particles-A are charged in the state they are more strongly attracted to the charge-providing member than to the toner. Hence, the rise of charging of the toner can be accelerated. On the other hand, once the charging has risen, the inorganic fine particles-A are more strongly attracted to the toner than to the charge-providing member, so that they function to moderate excessive charging. Thus, the toner with the constitution of the present invention can well and stably maintain the levels of the rise of charging and quantity of saturated triboelectricity in various environments.

With regard to the particle diameter, when the inorganic fine particles are buried in toner particles the function of moderating charge-up can be retained, but the fluidity providing properties will be lowered. Hence, the inorganic fine particles that give the moderating function, that is, the inorganic fine particles-A are made to have a large particle diameter to provide an appropriate space between the toner particles and the charge-providing member so that the inorganic fine particles-B can be prevented from being buried in toner particles. Thus, the fluidity of the toner can be maintained over a long period.

As the inorganic fine particles usable in the present invention, all sorts of inorganic fine particles can be used so long as they have a low chargeability in themselves. As the inorganic fine particles-A, fine titanium oxide particles or fine aluminum oxide particles can be used, which are readily made hydrophobic to have a positive chargeability. As the inorganic fine particle-B, fine titanium oxide particles can be used, which are readily made hydrophobic to have a negative chargeability. The fine titanium oxide particles may preferably be of anatase type crystal or amorphous type, in view of stability to light.

The preferable coupling agent for treating the inorganic fine particles-B may include silane coupling agents and titanium coupling agents.

In the present invention, the aqueous medium is a medium mainly composed of water. The aqueous medium may specifically include water itself, water containing a small quantity of surface active agent, water containing a pH adjustor, and water containing an organic solvent. The surface active agent may preferably be a nonionic surface active agent such as polyvinyl alcohol. The surface active agent should be added in an amount of from 0.1 to 5% by weight. The pH adjustor may include inorganic acids such as hydrochloric acid.

In a preferred embodiment, the inorganic fine particles-A comprise treated fine titanium oxide particles or treated fine aluminum oxide particles chargeable to a polarity reverse to that of colorant-containing resin particles, the inorganic fine particles-B comprise treated fine titanium oxide particles chargeable to the same polarity as that of colorant-containing resin particles.

Therefore, it is preferable to use a toner having i) inorganic fine particles-A which have been treated to obtain hydrophobicity by the hydrolysis of a fatty acid compound in an aqueous medium and ii) inorganic fine particles-B which have been treated to obtain hydrophobicity with the silicone oil or silicone varnish in an aqueous medium, or by hydrolising the coupling agent in an aqueous medium.

The fine titanium oxide powder should be added and mixed in an amount of from 0.1 to 10 parts by weight to 100 parts by weight of the aqueous medium, and then treated with the treating agent. The stirring should be thoroughly carried out so that the fine titanium oxide powder is made into the primary particles in the aqueous medium, using, for example, a mixing machine equipped with an agitating blade, specifically, a mixer with a high shear force as exemplified by an attritor and a TK homomixer.

The present invention can be more effective when organic resin particles are added as an external additives, the resin particles having a polarity reverse to the colorant-containing resin particles and an average particle diameter of from 0.02 to 0.5 and preferably having two particle distribution peaks at particle diameters of from 0.02 to 0.2 μm and from 0.3 to 0.8 μm.

The reason therefor is that any charge-up of the toner of the present invention is moderated by the organic resin particles described above.

The addition of the organic resin particles also enables acceleration of the rise of charging of the toner, so that a very stable charge performance from the initial stage can be achieved.

The reason therefor is still unclear. It can be presumed as follows: At the initial stage of the friction between a charge-providing member, e.g., a carrier, and the toner, the organic resin particles are charged in the state they are more strongly attracted to the charge-providing member than to the colorant-containing resin particles. Hence, the rise of charging of the colorant-containing resin particles with reverse polarity can be accelerated. On the other hand, once the charging has risen, the organic resin particles are more strongly attracted to the colorant-containing resin particles than to the charge-providing member, so that they function to moderate excessive charging. Thus, the toner with the constitution of the present invention can well and stably maintain the levels of the rise of charging and quantity of saturated triboelectricity in various environments.

In order to make the above action more effective, the organic resin particles may preferably have two particle distribution peaks at particle diameters from 20 to 200 mµ and from 300 to 800 mµ. Particles corresponding to the peak at the larger diameter should be present in a proportion from 2 to 20% by weight, and more preferably from 3 to 13% by weight. If the particle distribution peak is present at a smaller diameter than the above range, the organic resin particles may excessively strongly adhere to the colorant-containing resin particles or may be varied therein, resulting in a loss of the stated effect. On the other hand, if the peak is present at a larger diameter than the above range, the organic resin particles may be non-uniformly dispersed or become free, resulting in a loss of the stated effect.

In the present invention, in order to ensure the performance of the additive and provide a stable negative chargeability, the organic-resin particles may preferably be contained in an amount of from 0.1 to 5% by weight based on the weight of the colorant-containing resin particles.

The organic resin particles are also preferable when the toner has a smaller particle diameter.

Making the diameter of smaller results in an increase in contact points between toner particles and the carrier, which tends to deteriorate the carrier surface, or increase in contact points between toner particles which tends to cause toner blocking. On the other hand, the organic resin particles having an appropriate particle size of from 0.2 to 0.02 µ can serve as effective spacer particles. To prevent the toner blocking, it is more effective to use reverse-polarity resin particles having a higher Tg than the Tg of the binder resin of the toner.

As previously discussed, the addition of resin particles with a reverse polarity to a toner has been disclosed in several cases. For example, Japanese Laid-Open Patent Application No. 54-45135 and Japanese Patent Publication No. 52-32256 propose to add colorless resin particles smaller than toner particles.

In these cases, however, the toner and the resin particles having the reverse polarity to the toner behave separately, where the toner particles adhere to a latent image area and the reverse-polarity resin particles adhere to a background area.

This means that the reverse-polarity resin particles act to promote the charging of the toner. In the present invention, however, reverse-polarity resin particles sufficiently small relative to toner particle diameters are used so that they may finally strongly adhere to toner particles and participate in development together with the toner particles, and the relatively coarse resin particles, with particle diameters of from 300 to 800 µm, are to suitably remain in the transfer residue so that the cleaning performance can be improved. The present invention has such characteristic features and hence is different from the invention disclosed in the above publications.

Recently, another proposal is made in Japanese Laid-Open Patent Application No. 1-113767 as to a system in which silica and organic resin particles are simultaneously used. These are used to weaken the adhesion between the drum and the toner. In the present invention, however, these are used to improve cleaning performance, i.e., to appropriately remove foreign matters from the drum which has a function to weaken the adhesion constitutionally. The present invention is thus different from the invention disclosed in the above publication.

A proposal is also made in Japanese Patent Publication No. 2-3172 as to a system in which reverse-polarity resin particles are used not to lower the charge of the toner. In the present invention, the reverse-polarity resin particles are intentionally used to lower charge for a non-magnetic color toner which tends to be excessively charged. Thus what is disclosed therein is different from the present invention.

There are no particular limitations on monomers as the constitutents of the reverse-polarity resin particles for in the present invention, provided that they are selected taking account of the quantity of triboelectricity of the toner. Addition-polymerizable monomers usable in the present invention may include the following monomers as an example.

They include styrene, and derivatives thereof for example, alkyl styrenes such as methyl styrene, dimethyl styrene, trimethyl styrene, ethyl styrene, diethyl styrene, triethyl styrene, propyl styrene, butyl styrene, hexyl styrene, heptyl styrene and octyl styrene, halogenated styrenes such as fluorostyrene, chlorostyrene, bromostyrene, dibromostyrene and iodostyrene, and also nitrostyrene, acetylstyrene and methoxystyrene.

Addition-polymerizable unsaturated carboxylic acids may include addition-polymerizable unsaturated aliphatic monocarboxylic acids such as acrylic acid, methacrylic acid, α-ethylacrylic acid, crotonic acid, α-methylcrotonic acid, α-ethylcrotonic acid, isocrotonic acid, tiglic acid and ungelic acid; and addition-polymerizable unsaturated aliphatic dicarboxylic acids such as maleic acid, fumaric acid, iraconic acid, citraconic acid, methaconic acid, glutaconic acid and dihydromuconic acid.

Metal salts of these carboxylic acids can also be used, and the preparation of metal salts can be carried out after completion of polymerization.

The monomers may also include compounds obtained by esterification of any of the above addition-polymerizable unsaturated carboxylic acids with an alcohol such as an alkyl alcohol, an alkyl halide alcohol, an alkoxyalkyl alcohol, an aralkyl alcohol or an alkenyl alcohol. Such an alcohol may include alkyl alcohols such as methyl alcohol, ethyl alcohol, propyl alcohol, butyl alcohol, amyl alcohol, hexyl alcohol, heptyl alcohol, octyl alcohol, nonyl alcohol, dodecyl alcohol, tetradecyl alcohol and hexadecyl alcohol; alkyl halide alcohols obtained by halogenating part of any of these alkyl alcohols; alkoxyalkyl alcohols such as methoxyethyl alcohol, ethoxyethyl alcohol, ethoxyethoxyethyl alcohol, methoxypropyl alcohol and ethoxypropyl alcohol; aralkyl alcohols such as benzyl alcohol, phenylethyl alcohol and phenylpropyl alcohol; and alkenyl alcohols such as allyl alcohol and crotonyl alcohol.

They also include amides and nitriles derived from any of the above addition-polymerizable unsaturated carboxylic acids; aliphatic monoolefins such as ethylene, propylene, butene and isobutylene; aliphatic olefin halides such as vinyl chloride, vinyl bromide, vinyl iodide, 1,2-dichloroethylene, 1,2-dibromoethylene, 1,2-diiodoethylene, isopropenyl chloride, isopropenyl bromide, allyl chloride, allyl bromide, vinylidene chloride, vinyl fluoride and vinylidene fluoride; and conjugated aliphatic olafins such as 1,3-butadiene, 1,3-pentadiene, 2-methyl-1,3-butadiene, 2,3-dimethyl-1,3-butadiene, 2,4-hexadiene and 3-methyl-2,4-hexadiene.

They may further include vinyl acetates, vinyl ethers, and nitrogen-containing vinyl compounds such as vinylcarbazole, vinylpyridine and vinylpyrrolidone.

Polymers of any one or more kinds of these monomers can be used in the fine powder according to the present invention.

The reverse-polarity resin particles used in the present invention are not limited to only one kind, but plural kinds of resin particles can be used in combination.

The reverse-polarity resin particles used in the present invention can be prepared by any processes for making spherical fine particles, for examle, spray drying, suspension polymerization, emulsion polymerization, soap-free polymerization, seed polymerization and mechanical pulverization. Of these processes, particularly preferred is soap-free polymerization because of non existence of the emulsifying agent which inhibits charge performance of the toner and less environment-dependent variations of electrical resistivity since there can be no emulsifying agent remaining after the polymerization.

In order to make the resin particles to have two particle diameter distribution peaks, two kind of particles may be blended by dry process or blended by wet process followed by drying. More preferably, at the time of drying from the emulsion after polymerization, primary particles may be appropriately coalesced to give the two peak particle diameters. If necessary, heating or disintegration may be applied.

The reverse-polarity resin particles may be optionally subjected to particle surface treatment. The surface treatment includes vacuum deposition or plating to treat particle surfaces with a metal such as iron, nickel, cobalt, copper, zinc, gold or silver, ionic adsorption or external addition of any of the above metals, a metal oxide such as conductive zinc oxide, or the like, or coating or external addition of a triboelectrically chargeable organic compound such as a pigment or a dye, or also a polymer resin, etc..

The reverse-polarity resin particles are required to have a molecular weight distribution pattern wherein a peak is present at the molecular weight ranging from 10,000 to 5,000,000, preferably from 20,000 to 1,000,000. Resin particles having a distribution peak at the molecular weight larger than 5,000,000 may adversely affect the fixing performance of the color toner, and those having the distribution peak at the molecular weight smaller than 10,000 may cause contamination of magnetic particles or bring about a poor blocking resistance.

The titanium oxide of the present invention is also preferable when the toner has a particle diameter as small as from 5 to 10 μm in weight average particle diameter. Making the toner diameter smaller results in an increase in surface area per weight, tending to cause excessive triboelectric charges. To overcome this disadvantage, the fine titanium oxide particles are able to control the charges and fluidity providing properties therefore greatly effective.

In the toner according to the present invention, a charge control agent may be mixed to make the charge performance stabilzed. In that instance, it is preferred to use a colorless or pale-colored charge control agent that does not affect the color tone of the toner. A negative charge control agent usable in that instance may include organic metal complexes as exemplified by a metal complex of an alkyl-substituted salicylic acid, e.g., a chromium or zinc complex of di-tert-butylsalicylic acid. When the negative charge control agent is mixed in the toner, it should be added in an amount of from 0.1 to 10 parts by weight, and preferably from 0.5 to 8 parts by weight, based on 100 parts by weight of the binder resin.

When the toner of the present invention and a carrier are blended to prepare a two-component developer, a good results can be obtained when the toner is in a concentration of from 2 to 12% by weight, and preferably from 3 to 9% by weight, in the developer. A toner concentration less than 2% by weight tends to cause a lowering of image density, and that more than 12% by weight tends to cause an increase in fogging or in-machine toner scatter to shorten the service life of the developer.

As the colorant used in the present invention, it is possible to use any known dyes and pigments as exemplified by Phthalocyanine Blue, Indanthrene Blue, Peacock Blue, Permanent Red, Lake Red, Rhodamin Lake, Hanza Yellow, Permanent Yellow and Benzidine Yellow. It may be contained in an amount of not more than 12 parts by weight, and preferably from 0.5 to 9 parts by weight, based on 100 parts of the binder resin, in order to ensure a sensitive reflection with respect to light transmission properties of OHP films.

To the toner of the present invention additives may be added so long as the properties of the toner are not damaged. Such additives may include, for example, lubricants such as Teflon, zinc stearate and polyvinylidene fluoride, or fixing aids as exemplified by a low-molecular weight polyethylene and a low-molecular weight polypropylene, and organic resin particles.

In preparing toner of the present invention, it is possible to apply a method in which component materials are well kneaded by means of a heat-kneading machine such as a heat roll, a kneader or an extruder, thereafter the kneaded product is pulverized by a mechanical means, and then the pulverized powder is classified to give a toner; a method in which materials such as colorants are dispersed in a binder resin solution, followed by spray drying to give a toner; and a method of preparing a toner by suspension polymerization, comprising mixing given materials with binder resin constituent polymerizable monomers to form a monomer composition, and subjecting an emulsion suspension of this composition to polymerization.

As a binder material used in the colorant-containing resin particles, various material resins conventionally known as toner binder resins for electrophotography can be used.

For example, it may include polystyrene, styrene copolymers such as a styrene/butadiene copolymer and a styrene/acrylate copolymer, polyethylene polymers, ethylene copolymers such as an ethylene/vinyl acetate copolymer and an ethylene/vinyl alcohol copolymer, phenol resins, epoxy resins, acrylphthalate resins, polyamide resins, polyester resins, and maleic acid resins. Regarding all the resins, there are no particular limitations on their preparation methods.

Of these resins, the effect of the present invention becomes supreme particularly when polyester resins are used, which have a high negative chargeability. The polyester resins can achieve excellent fixing performance, suitable for binder resins of color toners. The polyester resins however, have a strong negative chargeability and tend to give an excess quantity of triboelectricity. The problems can be settled and a superior toner can be obtained, when the polyester resins are used to constitute the present invention.

In particular, the following polyester resin is preferred because of its sharp melt properties, which is a polyester resin obtained by condensation polymerization of i) a diol component comprised of a bisphenol derivative or substituted bisphenol represented by the formula:

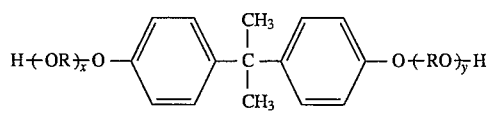

wherein R represents an ethylene group or a propylene group, and x and y each represent an integer of 1 or more, where x+y is 2 to 10 on the average and ii) a carboxylic acid component comprising a dibasic or more basic carboxylic acid, its acid anhydride or its lower alkyl ester, as exemplified by fumaric acid, maleic acid, maleic anhydride, phthalic acid, terephthalic acid, trimellitic acid and pyromellitic acid.

When the toner of the present invention is used together with the carrier to give a two-component developer, the surface of the carrier is coated with an electrically insulative resin properly selected considering toner materials end carrier core materials. In the present invention, in order to improve adhesion to the surfaces of carrier core materials, it is necessary to use a resin containing at least one monomer selected from acrylic acid (or its esters) monomers and methacrylic acid (or its esters) monomers. In particular, when the polyester resin particles having a high negative chargeability is used as a toner material, the resin may preferably be a copolymer with a styrene monomer for the purpose of stabilizing charge. The styfane monomers may preferably made to have a copolymerization weight ratio of from 5 to 70% by weight.

As the monomers usable in the present invention for the coating resin of the carrier core, styrene monomers may include, for example, styrene monomers, chlorostyrene monomers, α-methylstyrene monomers and styrene-chlorostyrene monomers; acrylic monomers may include, for example, acrylate monomers such as a methyl acrylate monomer, an ethyl acrylate monomer, a butyl acrylate monomer, an octyl acrylate monomer, a phenyl acrylate monomer and a 2-ethylhexyl acrylate monomer; and methacrylate monomers such as a methyl methacrylate monomer, an ethyl methacrylate monomer, a butyl methacrylate monomer and a phenyl methacrylate monomer.

As the carrier core material( magnetic material) for the present invention, it is possible to use, for example, surface-oxidized or -unoxidized particles of metals such as iron, nickel, copper, zinc, cobalt, manganese, chromium and rare earth elements, or alloys or oxides of any of these. There are no particular limitations on the method of preparing them. Magnetic ferrite carrier having a metal compositional ratio of copper, zinc and iron of 5–20:5–20:30–80 may preferably be contained in an amount of not less than 98% by weight.

An example of image forming apparatus for nonmagnetic one-component development using the toner of the present invention will be described below. The example is by no means limited to this. FIG. 1 illustrates an apparatus for developing an electrostatic image formed on a latent image bearing member. Reference numeral 1 denotes a latent image bearing member 1. A latent image is formed thereon through an electrophotographic process means or electrostatic recording means (not shown). Reference numeral 2 denotes a developer carrying member, which is comprised of a non-magnetic sleeve made of aluminum, stainless steel or the like. A non-magnetic one-component color toner is reserved in a hopper 3, and fed onto the developer carrying member by means of a feed roller 4. The feed roller 4 also takes off the toner remaining on the developer carrying member after development. The toner fed onto the developer carrying member is spread in a uniform and thin layer by means of a developer coating blade 5. It is effective for the contact pressure between the developer coating blade and the developer carrying member to be from 3 to 250 g/cm, and preferably from 10 to 120 g/cm, as a linear pressure in the mother line direction of the sleeve. A contact pressure smaller than 3 g/cm may make the uniform application of the toner difficult and may result in a broad distribution of charges of the toner causing fogging or black spots around the line. A contact pressure larger than 250 g/cm is not preferable since the large pressure applied to the toner causes agglomeration or pulverization of the toner particles. By adjusting of the contact pressure in the range of 3 g/cm to 250 g/cm, it becomes possible to disintegrate the agglomeration peculiar to toners with small particle diameter, and to instantaneously raise the quantity of triboelectricity of the toner. As the developer coating blade, it is preferred to use a material of a triboelectric series suited to electrostatically charge the toner in the desired polarity.

In the present invention, the developer coating blade may preferably be comprised of silicone rubber, urethane rubber, styrene-butadiene rubber, etc. It may also be coated with a polyamide resin. Use of a conductive rubber is preferable since the toner can be prevented from being charged in excess.

In the system in which the toner is spread in a thin layer onto the developer carrying member by means of the blade as proposed in the present invention, in order to obtain a sufficient image density, the thickness of the toner layer formed on the developer carrying member may preferably be made smaller than the length of clearance through which the developer carrying member and the latent image bearing member are opposed, and an alternating electric field is applied to this clearance. Using a bias electric source 6 as shown in FIG. 1, an alternating electric field, or a developing bias comprised of a direct-current electric field superimposed on an alternating electric field, is applied across the developer carrying member 2 and the latent image bearing member 1, whereby the toner can be moved with ease from the surface of the developer carrying member 2 to the surface of the latent image bearing member 1 and an image with a better quality can be obtained.

Methods of measurement of the respective physical properties in the present invention will be described below.
(1) Measurement of hydrophobicity:

Methanol titration is an experimental method for determining the hydrophobicity of fine titanium oxide powder whose particle surfaces have been made hydrophobic.

0.2 g of fine titanium oxide powder to be tested is added to 50 ml of water contained in an Erlenmeyer flask with a volume of 250 ml. Methanol is added dropwise from a buret until the whole of titanium oxide becomes wet with constant magnetic stirring of the content. The end point can be determined by observing the whole fine titanium oxide powder become suspended in the solution. The hydrophobicity is expressed as a percentage of the methanol when the reaction has reached the end point.
(2) Measurement of particle size of fine titanium oxide particles, treated fine titanium oxide particles and other inorganic fine particles:

Apparatus

A Coulter counter Type-NA is used as a measuring apparatus and Type UD-200, manufactured by Tomy Seiko K. K., is used as an ultrasonic wave generator for dispersion.

Method

In 30 to 50 ml of distilled water to which a small amount of surface active agent has been added, a suitable amount of sample is introduced to carry out dispersion for about 2 to 5 minutes at an output of 2 to 6 using the above ultrasonic wave generator. The dispersion of the sample is transferred to a cell. After air bubbles have come off, the cell is set to the above Coulter counter, whose measuring temperature previously set to 50° C. After 10 to 20 minute incubation to make the sample reach to a constant temperature, the measurement is started to determine volume average particle size distribution.
(3) Measurement of particle size of colorant-containing resin particles or toner:

The particle size distribution of colorant-containing resin particles or toner can be measured by various methods. In the present invention, it is measured using a Coulter counter.

A Coulter counter Type TA-II (manufactured by Coulter Electronics, Inc.) is used as a measuring device to which an interface (manufactured by Nikkaki k. k.) that outputs number distribution and volume distribution and a personal computer CX-1 (manufactured by Canon Inc.) are connected. As an electrolytic solution, an aqueous 1% NaCl solution is prepared using first-grade sodium chloride. Measurement is carried out by adding as a dispersant from 0.1 to 5 ml of a surface active agent, preferably an alkylbenzene sulfonate, to from 100 to 150 ml of the above aqueous electrolytic solution, and further adding from 2 to 20 mg of a sample to be measured. The electrolytic solution in which the sample has been suspended is dispersed for about 1 minute to about 3 minutes in an ultrasonic dispersion machine. The particle size distribution in a range of 2 to 40 μm are measured based on number by means of the above Coulter counter Type TA-II, with a 100 μm aperture. Then the values according to the present invention are determined.

(4) Measurement of particle size of organic resin particles:
Apparatus

A Coulter counter Type-N4 is used as a measuring apparatus and Type UD-200, manufactured by Tomy Seiko K. K., is used as an ultrasonic wave generator for dispersion.

Method

In 30 to 50 ml of distilled water to which a small amount of surface active agent has been added, a suitable amount of sample is added and dispersed for about 2 to 5 minutes at an output of 2 to 6 using the above ultrasonic wave generator. The sample dispersion is transferred to a cell. After air bubbles have come off, the cell is set to the above Coulter counter, whose measuring temperature has been previously set to 50° C. After 10 to 20 minute incubation until the sample reaches to a constant temperature, the measurement is started to determine volume average particle size distribution.

(5) Measurement of quantity of triboelectricity

A measuring method will be described in detail with reference to FIG. 2.

Figure 2:
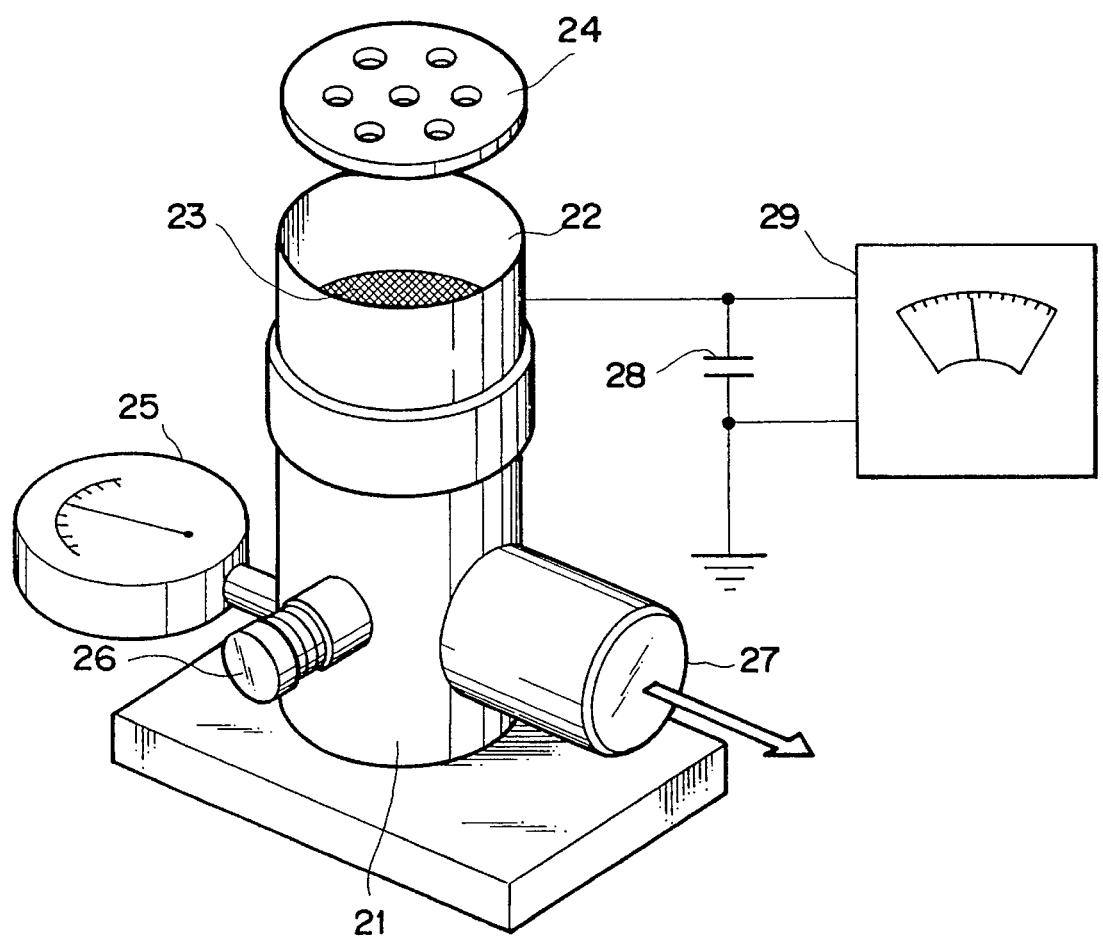
FIG. 2 illustrates an apparatus for measuring the quantity of triboelectricity of a sample.

FIG. 2 illustrates an apparatus for measuring the quantity of triboelectricity of a powder sample. First, a mixture of a toner the quantity of triboelectricity of which is to be measured and a carrier, mixed in a proportion of 1:19 in weight ratio, or a mixture of 1:99 in the case of the external additive, is put in a 50–100 ml polyethylene bottle and manually shaked for about 10 to 40 seconds. The resulting mixture (developer) in an amount of about 0.5 to 1.5 g is put in a measuring container 22 made of a metal at the bottom of which a screen 21 of 500 meshes is provided, and the container is covered with a metal lid 23. The total weight of the measuring container 22 in this state is weighed and is expressed as $W_1$ (g). Next, in a suction device 24 (made of an insulating material at least at the apart coming into contact with the measuring container 22), air is sucked from a suction opening 25 and an air-flow control valve 26 is operated to control the pressure indicated by a vacuum indicator 27 to be 250 mmHg. In this state, suction is sufficiently carried out, preferably for about 2 minutes, to remove the toner by suction. The potential indicated by a potentiometer 28 at this time is expressed as V (volt). Herein, reference numeral 29 denotes a capacitor, whose capacitance is expressed as C (μF). The total weight of the measuring container after completion of the suction is also weighed and is expressed as $W_2$ (g). The quantity of triboelectricity (μc/g) of the toner is calculated as shown by the following expression.

$$\text{Quantity of triboelectricity of the sample (μc/g)} = \frac{C \times V}{W_1 - W_2}$$

(Measurement is carried out under conditions of 23° C. and 60% RH.)

A coated ferrite carrier of the present invention, where 70 to 90% by weight of carrier particles are 250 mesh-pass and 350 mesh-on, is used as the carrier used in the measurement.

(6) Light transmittance

The fine titanium oxide powder or treated fine titanium oxide powder is dispersed in ethanol in a concentration of 0.1% by weight as solid content, and light transmittance at a wavelength of 400 nm is measured using UV2200, manufactured by Shimadzu Corporation.

EXAMPLES

Examples of the present invention will be described below. In the following, "part(s)" refers to "part(s) by weight".

Preparation Example 1 (Present Invention)

Titanium tetraisopropoxide was oxidized in a gaseous phase at 400° C., to give a spherical, amorphous type hydrophilic fine titanium oxide powder with an average particle diameter of 0.02 μBm and a BET specific surface area of 155 m²/g. To 100 parts of water as an aqueous medium, 1 part of the fine titanium oxide powder thus obtained was added, and the mixture was thoroughly stirred. Thereafter, 0.2 part of a silane coupling agent (n-$C_6H_{13}$Si(OCH$_3$)$_3$) was added to the aqueous medium, and thoroughly stirred so as not to cause coalescence of the fine titanium oxide particles. After the stirring, the dispersion was filtered, dried, and then softly disintegrated to give treated fine titanium oxide particles I with an average particle diameter of 0.02 μm and a hydrophobicity of 50%. Fluorescent X-ray analysis confirmed that the treated fine titanium oxide particles I thus obtained had been treated with the silane coupling agent (silane coupling agent in an amount of about 20 parts based on 100 parts of titanium oxide).

Preparation Example 2 (Comparative Example)

The spherical, hydrophilic titanium oxide as used in Preparation Example 1 was treated with the same coupling agent in a gaseous phase, followed by disintegration to give treated fine titanium oxide particles II with an average particle diameter of 0.03 μm and a hydrophobicity of 60%.

Preparation Example 3 (Present Invention)

Preparation Example 1 was repeated except that a mixture of 100 parts of water and 2 parts of polyvinyl alcohol was used as the aqueous medium, the silane coupling agent was replaced with dimethylpolysiloxane (dimethylsilicone oil) having a viscosity of 500 cSt at a temperature of 25° C., to give a treated fine titanium oxide particles III with an average particle diameter of 0.03 μm and a hydrophobicity of 60%. Fluorescent X-ray analysis confirmed that the treated fine titanium oxide particles III thus obtained had been treated with about 15% by weight of dimethylpolysiloxane.

Preparation Example 4 (Present Invention)

Preparation Example 1 was repeated except that the silane coupling agent was replaced with 0.2 part of sodium stearate, to give a treated fine titanium oxide particles IV with an average particle diameter of 0.03 μm and a hydrophobicity of 50%.

Preparation Example 5 (Present Invention)

The fine titanium oxide particles I was further treated with 10% by weight of trimethylchlorosilane in a gaseous phase to give treated fine titanium oxide particles V with an average particle diameter of 0.03 μm and a hydrophobicity of 70%.

Preparation Example 6 (Comparative Example)

The fine titanium oxide particles I was further treated with 25% by weight of dimethylpolysiloxane of 5,000 cSt in a gaseous phase to give fine titanium oxide particles VI with an average particle diameter of 0.03 μm and a hydrophobicity of 85%.

Preparation Example 7 (Comparative Example)

Hydrophilic fine titanium oxide particles with an average particle diameter of 0.4 μm and a BET specific surface area of 12 m'/g, were prepared from titanium chloride and treated in the same manner as in Preparation Example 1 to give treated fine titanium oxide particles VII with an average particle diameter of 0.4 μm and a hydrophobicity of 40%.

Examples 1 to 4 & Comparative Examples 1 to 4

| | |
|---|---|
| Polyester resin obtained by condensation of propoxylated bisphenol and fumaric acid | 100 parts |
| Phthalocyanine pigment | 4 parts |
| Chromium complex of di-tert-butylsalicylic acid | 2 parts |

The above materials were thoroughly premixed using a Henschel mixer, and then melt-kneaded using a twin-screw extruder. After cooled, the kneaded product was crushed using a hammer mill to give coarse particles of about 1 to 2 mm in diameter, which were then finely pulverized using a fine pulverizer of an air-jet system. The resulting finely pulverized product was classified and particles within 2 to 10 μm in diameter were selected so as to come in the particle size distribution of the present invention. Thus, colorant-containing resin particles with a weight average particle diameter of 8.3 μm were obtained.

To 100 parts of the above colorant-containing resin particles, 0.5 part of each treated fine titanium oxide particles were added to give cyan toners.

Next, 5 parts of each cyan toner and 95 parts of a magnetic carrier comprised of Cu-Zn-Fe ferrite carrier cores having a weight average particle diameter of 45 μm (particle size distribution: ≦35 μm, 4.2% by weight; 36 to 40 μm, 9.5% by weight; >74 μm, 0.2% by weight) coated with 0.5% by weight of a copolymer comprised of 75% by weight of methyl methacrylate and 25% by weight of butyl acrylate, were blended to give two-component developers.

These developers were each applied in a commercially available plain-paper color copier (CLC 500, manufactured by Canon Inc.), and images were reproduced in an environment of 23° C. and 65% RH, setting development contrast at 300 V. Results obtained are shown in Table 1.

TABLE 1

| | Results of Evaluation of Image Characteristics | | | | | |
|---|---|---|---|---|---|---|
| | Treated fine titanium oxide powder | Image density | High-light repro-duc-tion | Solid image uni-form-ity | Run-ning per-form-ance | Shelf sta-bility |
| Example: | | | | | | |
| 1 | I | 1.4–1.5 | AA | A | AA | A |
| 2 | III | 1.35–1.5 | A | AA | AA | A |
| 3 | IV | 1.5–1.6 | A | AA | A | A |
| 4 | V | 1.3–1.45 | A | A | AA | AA |
| Com-parative Example: | | | | | | |
| 1 | II | 1.4–1.5 | B | B | A | A |
| 2 | VI | 1.2–1.4 | B | B | BC | A |
| 3 | VII | 1.2–1.3 | C | C | C | B |
| 4 | TO* | 1.6–1.8 | AA | A | B | B |

*Non-treated titanium oxide
Evaluation:
AA: Excellent,
A: Good,
B: Passable,
BC: A little poor,
C: Poor

Preparation Example 8

Using hydrophilic fine titanium oxide powder (average particle diameter: 0.05 μ; BET specific surface area: 120 m$^2$/g), n-C$_6$H$_{13}$Si(OCH$_3$)$_3$ was added and mixed in an aqueous medium with stirring, so as to be in an amount of 20% by weight based on the fine titanium oxide particles without causing coalescence of particles. The mixture was then dried and disintegrated to give treated fine titanium oxide particles VIII with an average particle diameter of 0.05 μm and a hydrophobicity of 40%.

Preparation Example 9

Preparation Example 8 was repeated except that

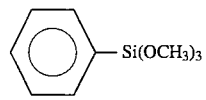

was used, to give treated fine titanium oxide particles IX with an average particle diameter of 0.05 μm and a hydrophobicity of 30%.

Preparation Example 10

The treated fine titanium oxide particles VIII was further treated with 5% by weight of (CH$_3$)$_2$Si(OCH$_3$)$_2$ in a gaseous phase, to give treated fine titanium oxide particles X with an average particle diameter of 0.05 μm and a hydrophobicity of 50%.

Preparation Example 11 (Comparative Example)

Preparation Example 8 was repeated except that the treatment was carried out not in the aqueous medium but in a gaseous phase, to give treated fine titanium oxide particles XI with an average particle diameter of 0.06 μm and a hydrophobicity of 50%.

Preparation Example 12 (Comparative Example)

Preparation Example 8 was repeated except that hydrophilic fine titanium oxide particles (average particle diameter: 0.4 μ; BET specific surface area: 12 m$^2$/g) were used, to give treated fine titanium oxide particles XII with an average particle diameter of 0.4 μm and a hydrophobicity of 50%.

Preparation Example 13 (Comparative Example)

The treated fine titanium oxide particles VIII was further treated with 10% by weight of dimethylpolysiloxane of 500 cSt, to give treated fine titanium oxide particles XIII with an average particle diameter of 0.06 μm and a hydrophobicity of 60%.

Preparation Example 14 (Comparative Example)

The treated fine titanium oxide particles VIII was further treated with 30% by weight of n-$C_{16}H^{33}Si(OCH_3)_3$, to give treated fine titanium oxide particles XIV with an average particle diameter of 0.06 μm and a hydrophobicity of 90%.

Example 5

| | |
|---|---|
| Polyester resin obtained by condensation of propoxylated bisphenol and fumaric acid | 100 parts |
| Phthalocyanine pigment | 4 parts |
| Chromium complex of di-tert-butylsalicylic acid | 2 parts |

The above materials were thoroughly premixed using a Henschel mixer, and then melt-kneaded using a twin-screw extruder. After cooled, the kneaded product was crushed using a hammer mill to give coarse particles of about 1 to 2 mm in diameter, which were then finely pulverized using a fine pulverizer of an air-jet system. The resulting finely pulverized product was classified to give colorant-containing resin particles with a weight average particle diameter of 8 μm.

Next, 100 parts of the above colorant-containing resin particles, 0.5 part of treated fine titanium oxide particles X and 0.3 parts of styrene/methyl methacrylate resin particles of which distribution pattern has two peaks at a particle diameter of 0.055 μm and a particle diameter of 0.5 μm were blended to give a cyan toner.

Next, 5 parts of this cyan toner and 95 parts of a magnetic carrier comprised of Cu-Zn-Fe ferrite carrier cores having a weight average particle diameter of 45 μm (particle size distribution: ≦35 μm, 4.2% by weight; 36 to 40 μm, 9.5% by weight; ≧74 μm, 0.2% by weight), coated with 0.5% by weight of a copolymer comprised of 75% by weight of methyl methacrylate and 25% by weight of butyl acrylate, were blended to give a two-component developer.

This developer was applied in a commercially available plain-paper color copier (Color Laser Copier 500, manufactured by Canon Inc.), and the image reproduction was carried out in an environment of 23° C. and 65%RH, setting development contrast at 300 V. As a result, the image density was as high as 1.45, and the image was sharp and free from fog. Copies were thereafter further taken on 10,000 sheets, during which image density fluctuated by only 0.12 and the same fog-free, sharp images as those at the initial stage were obtained. In an environment of low temperature and low humidity (20° C., 10%RH), images were reproduced setting the development contrast at 300 V. As a result, image density was as high as 1.41, suggesting that the quantity of triboelectricity in an environment of low humidity was effectively controlled.

In an environment of high temperature and high humidity (30° C, 80%RH), images were also reproduced setting the development contrast at 300 V. As a result, image density was 1.50, and very stable and good images were obtained.

After the developer was left to stand for 1 month in each environment of 23° C./60%RH, 20° C./10%RH and 30° C./80%RH, reproduced images also showed no undesirable changes.

Comparative Example 5

A developer were prepared in the same manner as in Example 1 except that the fine titanium oxide particles used therein was replaced with hydrophilic fine titanium oxide particles not treated with the coupling agent (hydrophobicity: 0%). Images were also reproduced similarly. As a result, initial images reproduced after the developer was left to stand for 1 month in an environment of 30° C./80%RH had an image density of as high as 1.68, and fogging was slightly seen.

Comparative Example 6

A developer was prepared in the same manner as in Example 5 except that the fine titanium oxide particles used therein was replaced with fine titanium oxide particles XI. Images were also reproduced similarly. As a result, fogging was seen in the environment of 30%C/80%RH and also black spots around the line slightly occurred. This was because the treatment was carried out not in the aqueous medium first but in the gaseous phase, and hence coalescence of titanium oxide particles occurred, resulting in a damage of fluidity of the toner.

Comparative Example 7

A developer was prepared in the same manner as in Example 5 except that the fine titanium oxide particles used therein was replaced with fine titanium oxide particles XII. Images were also reproduced similarly. As a result, fogging was seen in the environment of 30° C./80%RH and also black spots around the line slightly occurred.

Comparative Example 8

A developer was prepared in the same manner as in Example 5 except that the fine titanium oxide particles used therein was replaced with fine titanium oxide particles XIII. Images were also reproduced similarly. As a result, fogging was seen in the environment of 20° C./10%RH and also black spots around the line slightly occurred.

Comparative Example 9

A developer was prepared in the same manner as in Example 5 except that the fine titanium oxide particles used therein was replaced with fine titanium oxide particles XIV. Images were also reproduced similarly. As a result, faulty images probably due to the coalescence of fine titanium oxide particles occurred at solid areas in the environment of 20° C./10%RH.

Example 6

A developer was prepared in the same manner as in Example 5 except that the fine titanium oxide particles used therein was replaced with fine titanium oxide particles VIII. Images were also reproduced similarly. As a result, although the image density became higher by 0.05 to 0.1 in the environment of 30° C./80%RH, high-light reproduction was a little superior, and good results were obtained.

Example 7

A developer was prepared in the same manner as in Example 5 except that the fine titanium oxide particles used therein was replaced with fine titanium oxide particles IX. Images were also reproduced similarly. As a result, the same good results as in Example 6 were obtained.

Preparation Example 15

While 100 parts of hydrophilic fine titanium oxide particles produced from titanium chloride and having an anatase type crystal system (average particle diameter: 0.05 μm; BET specific surface area: 120 m$^2$/g) were mixed and stirred in an aqueous medium, an emulsion prepared by dispersing, in an aqueous medium, dimethylpolysiloxane with a viscosity of 500 cSt at 25° C. was added and mixed so as to be in an amount of 5 parts based on the fine titanium oxide particles in terms of solid content without causing coalescence of particles. The mixture was then dried and disintegrated to give treated fine titanium oxide particles XV with a hydrophobicity of 30%, an average particle diameter of 0.05 μm and a transmittance of 50% at 400 nm.

Preparation Example 16

Treated fine titanium oxide particles XV were stirred in a three-necked flask heated to 150° C. with a mantle heater, to one neck of which an empty balloon was attached, and a solution prepared by diluting 20 parts of n-C$_8$H$_{17}$Si(OCH$_3$)$_3$ and 5 parts of acetic acid, based on 100 parts of fine titanium oxide particles, to 1/5 with methanol was dropwise added from the top through a dropping funnel. After completing the addition, the contents of the flask was continuously stirred for 1 hour, and then left to stand to cool, thus giving treated fine titanium oxide particles XVI with a hydrophobicity of 65%, an average particle diameter of 0.05 μm and a transmittance of 57% at 400 nm.

Preparation Examples 17 & 18

Preparation Example 16 was repeated except that 20 parts of n-C$_8$H$_{17}$Si(OCH$_3$)$_3$ as the coupling agent and 5 parts of methylamine as the base were used, or 20 parts of n-C$_{10}$H$_{21}$Si(OCH$_3$)$_3$ and 5 parts of formic acid were used, to give treated fine titanium oxide particles XVII with a hydrophobicity of 58%, an average particle diameter of 0.05 μm and a transmittance of 63% at 400 nm and treated fine titanium oxide particles XVIII with a hydrophobicity of 67%, an average particle diameter of 0.05 μm and a transmittance of 53% at 400 nm, respectively.

Preparation Example 19

Preparation Example 15 was repeated except that 25 parts of dimethylpolysiloxane was used, to give treated fine titanium oxide particles XIX with a hydrophobicity of 55%, an average particle diameter of 0.05 μm and a transmittance of 40% at 400 nm.

Preparation Example 20

Preparation Example 16 was repeated except that 10 parts of silane coupling agent was used, to give treated fine titanium oxide particles XX with a hydrophobicity of 41%, an average particle diameter of 0.05 μm and a transmittance of 64% at 400 nm.

Preparation Example 21 (Comparative Example)

Preparation Example 16 was repeated except that no acetic acid was used, to give treated fine titanium oxide particles XXI with a hydrophobicity of 46%, an average particle diameter of 0.24 μm and a transmittance of 11% at 400 nm.

Example 8

| | |
|---|---|
| Polyester resin obtained by condensation of propoxylated bisphenol and fumaric acid | 100 parts |
| Phthalocyanine pigment | 4 parts |
| Chromium complex of di-tert-butylsalicylic acid | 4 parts |

The above materials were thoroughly premixed using a Henschel mixer, and then melt-kneaded at least twice using a three-roller mill. After cooled, the kneaded product was crushed using a hammer mill to give coarse particles of about 1 to 2 mm in diameter, which were then finely pulverized using a fine pulverizer of an air-jet system. The resulting finely pulverized product was classified to give colorant-containing resin particles with a weight average particle diameter of about 8.4 μm.

The colorant-containing resin particles were mixed with 0.5% by weight of treated fine titanium oxide particles XVI to give a cyan toner. This cyan toner had a weight average particle diameter of 8.4 μm.

A magnetic carrier comprised of Cu-Zn-Fe ferrite carrier cores having a weight average particle diameter of 45 μm (particle size distribution: ≦35 μm, 4.2% by weight; 36 to 40 μm, 9.5% by weight; and ≧74 μm, 0.2% by weight), coated with 0.5% by weight of a copolymer comprised of 75% by weight of methyl methacrylate and 25% by weight of butyl acrylate was obtained. To 5 parts of the above toner, this magnetic carrier were blended to make the total amount 100 parts. A two-component developer was thus obtained.

This developer was applied in a commercially available plain-paper color copier (Color Laser Copier 500, manufactured by Canon Inc.), and images were reproduced in an environment of 23° C. and 65%RH, setting development contrast at 300 V. On the image thus obtained, reflection density was measured with Macbeth Densitometer RD918-Type using an SPI filter (hereinafter the image density was measured by the same method). The image had a high density of 1.48, completely free from fog, and sharp. OHP projected images were also sharp and free from turbidity. Then copies were taken upto 10,000 sheets, during which density fluctured by only 0.09 and the same fog-free, sharp images as those at the initial stage were obtained. In an environment of low temperature and low humidity (20° C., 10%RH), images were reproduced setting the development contrast at 300 V. As a result, image density was as high as 1.44, suggesting that the quantity of triboelectricity in an environment of low humidity was effectively controlled.

In an environment of high temperature and high humidity (30° C., 80%RH), images were also reproduced setting the development contrast at 300 V. As a result, image density was 1.55, and very stable and good images were obtained.

Initial images reproduced after the developer was left to stand for 1 month in each environment of 23° C./60%RH, 20° C./10%RH and 30° C./80%RH, also showed no undesirable changes.

Example 9

A developer was prepared in the same manner as in Example 8 except that the treated fine titanium oxide particles XVI used therein was replaced with treated fine titanium oxide particles XVII. Images were also reproduced similarly. As a result, although the image density slightly incresed to 1.50–1.56 in the environment of 30° C./80%RH, good results were obtained.

Example 10

A developer was prepared in the same manner as in Example 8 except that the treated fine titanium oxide particles XVI used therein was replaced with treated fine titanium oxide particles XVIII. Images were also reproduced similarly. As a result, although the image density slightly lowered to 1.38–1.44 in the environment of 20° C./10%RH, good results were obtained.

Example 11

Images were reproduced in the same manner as in Example 8 except that the developing assembly of the commercially available color copier (Color Laser Copier 500, manufactured by Canon Inc.) was modified as shown in FIG. 1 and no carrier was used. As a result, image densities were as good as;

1.44 to 1.47 in the environment of 20° C./10%RH;
1.49 to 1.50 in the environment of 23° C./65%RH; and
1.51 to 1.57 in the environment of 30° C./80%RH.

Example 12

Example 8 was repeated except that treated fine titanium oxide particles XX was used. As a result, although the image density slightly increased to 1.55–1.68 in the environment of 30° C./80%RH, good results were obtained.

Example 13

Example 8 was repeated except that the treated fine titanium oxide particles XVI used therein was replaced with treated fine titanium oxide particles XV. As a result, the image density increased to 1.70 in the environment of 30° C./80%RH, and also fogging was slightly seen.

Example 14

Example 8 was repeated except that the treated fine titanium oxide particles XVI used therein was replaced with treated fine titanium oxide particles XIX. As a result, when the developer was left for 1 month in the environment of 30° C./80%RH, the image density increased to 1.75 and also fogging and black spots around the line were slightly seen.

Comparative Example 11

Example 8 was repeated except that the treated fine titanium oxide particles XVI used therein was replaced with treated fine titanium oxide particles XXI. As a result, the fluidity decreased, the half-tone reproduction was lowered, and at the same time the sharpness of OHP projected images became poor.

Example 15

Hydrophilic fine titanium oxide particles (average particle diameter: 0.05 µm; BET specific surface area: 120 m$^2$/g) were mixed and stirred in an aqueous medium. Separately an emulsion of treating agent was prepared by dispersing n-$C_8H_{17}Si(OCH_3)_3$ in an aqueous medium and mixed with above titanium oxide in an amount of 25% by weight of the solid weight of fine titanium oxide particles without causing coalescence of particles. The mixture was then dried and disintegrated to give treated fine titanium oxide particles with a hydrophobicity of 70%, an average particle diameter of 0.05 µm and a transmittance of 55% at 400 nm.

Using a Henschel mixer, 0.1% by weight of this fine titanium oxide particles were mixed with the colorant-containing resin particles as obtained in Example 8 to give a cyan toner. This cyan toner had a weight average particle diameter of 8.2 µm.

To 5 parts of the above toner, the carrier as used in Example 8 was blended to an amount of 100 parts in total, giving a two-component developer.

Using this developer, images were reproduced in the same manner as in Example 8. As a result, the image had a high density of 1.49, and completely free from fog, and sharp. OHP projected images were also sharp and clear. After that 10000 copies were taken, during which the change of the density was as small as 0.09 and the same fog-free, sharp images as those at the initial stage were obtained. In an environment of low temperature and low humidity (20° C., 10%RH), images were reproduced setting the development contrast at 300 V. As a result, image density as high as 1.45 was obtained, suggesting that the quantity of triboelectricity in an environment of low humidity was effectively controlled.

In an environment of high temperature and high humidity (30° C., 80%RH), images were also reproduced setting the development contrast at 300 V. As a result, image density was 1.53, and very stable and good images were obtained.

When the developer was left to stand for 1 month in each environment of 23° C./60%RH, 20° C./10%RH and 30° C./80%RH, the initial images did not show any undesirable changes.

Example 16

Example 15 was repeated except that the fine titanium oxide particles used therein was replaced with fine titanium oxide particles treated with n-$C_6H_{13}Si(OCH_3)_3$ (hydrophobicity: 60%; average particle diameter: 0.05 µm; transmittance at 400 nm: 60%). As a result, although the image density slightly increased to 1.55–1.60 in the environment of 30° C./80%RH, good results were obtained.

Example 17

Example 15 was repeated except that the fine titanium oxide particles used therein was replaced with fine titanium oxide particles treated with n-$C_{10}H_{21}Si(OCH_3)_3$ (hydrophobicity: 70%; average particle diameter: 0.05 µm; transmittance at 400 nm: 45%). As a result, although the image density slightly decreased to 1.38–1.45 in the environment of 20° C./10%RH, good results were obtained.

Example 18

Example 15 was repeated except that the fine titanium oxide particles used therein was replaced with fine titanium oxide particles treated with n-$C_8H_{17}Si(OC_2H_5)_3$ (hydrophobicity: 75%; average particle diameter: 0.055 µm; transmittance at 400 nm: 40%). As a result, although the image density decreased very slightly to 1.40–1.45 in the environment of 20° C./10%RH, good results were obtained.

Example 19

Images were reproduced in the same manner as in Example 15 except that the developing assembly of the commercially available color copier (Color Laser Copier 500, manufactured by Canon Inc.) was modified as shown in FIG. 1 and no carrier was used. As a result, when 3000 copies were taken image densities were as good as;

1.46 to 1.53 in the environment of 20° C./10%RH;
1.50 to 1.55 in the environment of 23° C./65%RH; and
1.52 to 1.58 in the environment of 30° C./80%RH.

Comparative Example 12

Example 15 was repeated except that the treated fine titanium oxide particles used therein was replaced with fine titanium oxide particles treated with n-$C_3H_7Si(OCH_3)_3$ (hydrophobicity. 15%; average particle diameter: 0.05 µm; transmittance at 400 nm: 50%). As a result, the image density was excessively as high as 1.65 to 1.70 in the environment of 30° C./80%RH, and also fogging was slightly seen.

Comparative Example 13

Example 15 was repeated except that the treated fine titanium oxide particles used therein was replaced with fine titanium oxide particles treated with n-$C_{14}H_{29}Si(OCH_3)_3$ (hydrophobicity: 85%; average particle diameter: 0.06 µm; transmittance at 400 nm: 35%). As a result, the image density was as low as 1.30 to 1.40 in the environment of 20° C./10%RH, highlight reproduction was a little lowered, and also the sharpness of OHP projected images became slightly poor.

Comparative Example 14

Example 15 was repeated except that no titanium oxide was used. As a result, fluidity was insufficient and image quality was greatly reduced.

Comparative Example 15

Example 15 was repeated except that fine titanium oxide particles (hydrophobicity: 80%; average particle diameter: 0.3 µm; transmittance at 400 nm: 50%) which were prepared by sintering hydrophilic titanium oxide at a high temperature and by treating in the same way. As a result, fluidity decreased and image quality was lowered. OHP projected images were also poor.

Preparation Example 22

While hydrophilic fine titanium oxide particles was mixed with stirring in an aqueous medium, dimethylpolysiloxane with a viscosity of 500 cSt at 25° C. was added as a treating agent in an amount of 10% by weight of the fine titanium oxide particles in terms of solid content. The mixture was then dried and disintegrated to give inorganic fine particles I with a hydrophobicity of 40%.

Average particle diameter: 0.05 µm
BET specific surface area: 90 m$^2$/g
Quantity of triboelectricity: −2.0 µc/g

Preparation Example 23

Preparation Example 22 was repeated except that the fine titanium oxide particles were treated with 20% by weight sodium stearate, to give inorganic fine particles II with a hydrophobicity of 50%

Average particle diameter: 0.05 µm
BET specific surface area: 85 m$^2$/g
Quantity of triboelectricity: +21 µc/g

Preparation Example 24

Preparation Example 22 was repeated except that the fine titanium oxide particles were treated with 20% by weight n-$C_6H_{13}Si(OCH_3)_3$, to give inorganic fine particles III with a hydrophobicity of 50%.

Average particle diameter: 0.05 µm
BET specific surface area: 80 m$^2$/g
Quantity of triboelectricity: −18.5 µc/g

Preparation Example 25

Preparation Example 22 was repeated except that the fine titanium oxide particles were treated with 30% by weight dimethylpolysiloxane with a viscosity of 500 cSt at 25° C., to give inorganic fine particles IV with a hydrophobicity of 70%.

Average particle diameter: 0.06 µm
BET specific surface area: 80 m$^2$/g
Quantity of triboelectricity: −35 µc/g

Preparation Example 26

Preparation Example 22 was repeated except that hydrophilic fine aluminum oxide particles were treated with 10% by weight aluminum stearate, to give inorganic fine particles V with a hydrophobicity of 40%.

Average particle diameter: 0.04 µm
BET specific surface area: 100 m$^2$/g
Quantity of triboelectricity: +41 µc/g

Preparation Example 27

Preparation Example 22 was repeated except that hydrophilic fine titanium oxide particles with a larger particle diameter were used, to give inorganic fine particles VI with a hydrophobicity of 50%.

Average particle diameter: 0.4 µm
BET specific surface area: 12 m$^2$/g
Quantity of triboelectricity: −5.6 µc/g

Preparation Example 28

Preparation Example 22 was repeated except that the fine titanium oxide particles were treated with 30% by weight dimethylpolysiloxane with a viscosity of 5,000 cSt, to give inorganic fine particles VII with a hydrophobicity of 85%.

Average particle diameter: 0.05 µm
BET specific surface area: 60 m$^2$/g
Quantity of triboelectricity: −40 µc/g

Example 20

| | |
|---|---|
| Polyester resin obtained by condensation of propoxylated bisphenol and fumaric acid | 100 parts |
| Phthalocyanine pigment | 4 parts |
| Chromium complex of di-tert-butylsalicylic acid | 2 parts |

The above materials were thoroughly premixed using a Henschel mixer, and then melt-kneaded using a twin-screw extruder. After cooled, the kneaded product was crushed using a hammer mill to give coarse particles of about 1 to 2 mm in diameter, which were then finely pulverized using a fine pulverizer of an air-jet system. The resulting finely pulverized product was classified to give colorant-containing resin particles with a weight average particle diameter of 0.05 μm.

To 100 parts of the above colorant-containing resin particles, 0.5 part of inorganic fine particles I and 0.3 parts of inorganic fine particles II were added to give a cyan toner.

Next, 5 parts of this cyan toner and 95 parts of a magnetic carrier comprised of Cu-Zn-Fe ferrite carrier cores having a weight average particle diameter of 45 μm (particle size distribution: ≦35 μm, 4.2% by weight; 36 to 40 μm, 9.5% by weight; ≧74 μm, 0.2% by weight), coated with 0.5% by weight of a copolymer comprised of 75% by weight of methyl methacrylate and 25% by weight of butyl acrylate, were blended to give a two-component developer.

This developer was applied in a commercially available plain-paper color copier (Color Laser Copier 500, manufactured by Canon Inc.), and an image was reproduced in an environment of 23° C. and 65%RH, setting development contrast at 300 V. As a result, the image had a high density of 1.51, and free from fog, and sharp. Then 10,000 copies were taken, during which the change of the density was as small as 0.12 and the same fog-free, sharp images as those at the initial stage were obtained.

Images were also reproduced in an environment of 20° C., 10%RH and in an environment of 30° C., 80%RH. Results obtained are shown together in Tables 2 and 3.

Examples 21 to 23

External additives were changed as shown in Table 2 and added to the colorant-containing resin particles, and images were reproduced in the same manner as in Example 20. Results obtained are shown in Tables 2 and 3.

TABLE 2

| Example: | Inorganic fine particles-A | Inorganic fine particles-B | Image density 20° C./ 10% | 23° C./ 65% | 30° C./ 80% |
|---|---|---|---|---|---|
| 20 | II 0.3% | I 0.5% | 1.41 to 1.49 | 1.45 to 1.57 | 1.48 to 1.62 |
| 21 | II 0.3% | III 0.5% | 1.35 to 1.50 | 1.42 to 1.55 | 1.45 to 1.53 |
| 22 | V 0.3% | I 0.5% | 1.43 to 1.57 | 1.48 to 1.60 | 1.50 to 1.65 |
| 23 | V 0.3% | IV 0.5% | 1.40 to 1.53 | 1.42 to 1.52 | 1.45 to 1.55 |

TABLE 3

| | Shelf stability | Solid image uniformity | Running performance |
|---|---|---|---|
| Example 20 | A | AA | AA |
| Example 21 | AA | AA | AA |
| Example 22 | A | AA | AA |
| Example 23 | AA | A | AA |

Example 24

A yellow color toner was prepared in the same manner as in Example 1 except that the phthalocyanine pigment was replaced with 3.5 parts of C.I. Pigment Yellow. A two-component developer was prepared in the same manner as in Example 1, and images were reproduced in the same manner as in Example 1. As a result, good yellow color toner images were obtained. Good yellow color toner images were also obtained in each environment.

Example 25

A magenta color toner was prepared in the same manner as in Example 1 except that the phthalocyanine pigment was replaced with 0.8 part of C.I. Solvent Red 49 and 4.2 parts of C.I. Pigment Red 122. A two-component developer was prepared in the same manner as in Example 1, and images were reproduced in the same manner as in Example 1. As a result, good magenta color toner images were obtained. Good magenta color toner images were also obtained in each environment.

Example 26

The two-component developer prepared in Example 1, containing the cyan color toner, the two-component developer prepared in Example 24, containing the yellow color toner, and the two-component developer prepared in Example 25, containing the magenta color toner, were applied in a plain-paper full-color copier (CLC 500, manufactured by Canon Inc.), and the respective color toner images were reproduced under the same conditions as in Example 1 to form full-color images. As a result, full-color images with a good tone were obtained. Images were reproduced in each environment. As a result, good full-color images were obtained.

As the transfer medium, the plain paper was replaced with OHP film to form full-color images. As a result, full-color fixed images with a superior light transmission and a superior color tone were formed on the OHP film.

What is claimed is:

1. A toner for developing an electrostatic image, comprising colorant-containing resin particles and a hydrophobic fine titanium oxide powder, said hydrophobic fine titanium oxide powder having an average particle diameter of from 0.001 μm to 0.2 μm, a hydrophobicity of from 20% to 80% and a light transmittance of not less than 40% to light with a wavelength of 400 nm when said hydrophobic fine titanium oxide powder is dispersed in an ethanol solvent in a concentration of 1% by weight, wherein said colorant-containing resin particles contain a binder resin, a colorant and a negative charge control agent, and said hydrophobic fine titanium oxide powder having been obtained by dispersing hydrophilic fine titanium oxide powder in an aqueous medium comprised mainly of water to provide primary particles and then adding a coupling agent to said aqueous medium to make said dispersed particles hydrophobic in said aqueous medium and prevent coalescence.

2. The toner according to claim 1, wherein said fine titanium oxide powder has been made hydrophobic in an aqueous medium, using a silane coupling agent.

3. The toner according to claim 2, wherein said fine titanium oxide powder has been treated with a silane coupling agent used in an amount of from 1 part by weight to 40 parts by weight based on 100 parts by weight of the fine titanium oxide powder.

4. The toner according to claim 2, wherein said fine titanium oxide powder has been treated with a silane coupling agent used in an amount of from 3 parts by weight to 30 parts by weight based on 100 parts by weight of the fine titanium oxide powder.

5. The toner according to claim 1, wherein said fine titanium oxide powder has been made hydrophobic in an aqueous medium, using a silane coupling agent represented by the formula:

$$R_m SiY_n$$

wherein R represents an alkoxyl group; m represents an integer of 1 to 3; Y represents a hydrocarbon group; and n represents an integer of 1 to 3.

6. The toner according to claim 5, wherein said Y represents an alkyl group, a vinyl group, a glycidoxy group or a methacryl group.

7. The toner according to claim 1, wherein said fine titanium oxide powder has been made hydrophobic in an aqueous medium, using an alkyltrialkoxysilane coupling agent represented by the formula:

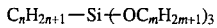

wherein m represents an integer of 1 to 3 and n represents an integer of 4 to 12.

8. The toner according to claim 1, wherein said fine titanium oxide powder is anatase in crystalline structure.

9. The toner according to claim 1, wherein said fine titanium oxide powder has an amorphous crystalline structure.

10. The toner according to claim 1, wherein said colorant-containing resin particles have a weight average particle diameter of from 5 μm to 10 μm.

11. The toner according to claim 1, wherein said colorant-containing resin particles contain a polyester resin.

12. The toner according to claim 1, wherein said colorant-containing resin particles contain a polyester resin produced by condensation polymerization of i) a diol component comprised of a bisphenol derivative or substituted bisphenol represented by the formula:

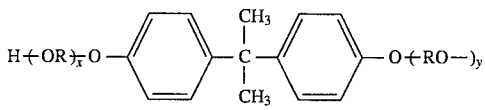

wherein R represents an ethylene group or a propylene group, x and y each represent an integer of 1 to 9, the total of (x+y) is 2 to 10 and ii) a carboxylic acid component comprising a dibasic or more basic carboxylic acid, its acid anhydride or its lower alkyl ester.

13. The toner according to claim 1, wherein said colorant-containing resin particles contain a colorant in an amount of from 0.5 part by weight to 9 parts by weight based on 100 parts by weight the binder resin.

14. The toner according to claim 1, wherein said fine titanium oxide powder has been made hydrophobic in an aqueous medium, and is further surface-treated in a gaseous phase.

15. The toner according to claim 14, wherein said fine titanium oxide powder has been made hydrophobic in an aqueous medium using a silane coupling agent, and is further surface-treated in a gaseous phase with a silane coupling agent.

16. The toner according to claim 14, wherein said fine titanium oxide powder has been made hydrophobic in an aqueous medium using an alkyltrialkoxysilane coupling agent represented by the formula:

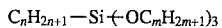

wherein m represents an integer of 1 to 3 and n represents an integer of 4 to 12, and is further surface-treated in a gaseous phase with an alkyltrialkoxysilane coupling agent represented by the formula:

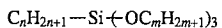

wherein m represents an integer of 1 to 3 and n represents an integer of 4 to 12.

17. The toner according to claim 14, wherein said fine titanium oxide powder having been made hydrophobic in an aqueous medium is treated with a silane coupling agent in a gaseous phase in an acidic or basic atmosphere.

18. The toner according to claim 17, wherein said silane coupling agent is an alkyltrialkoxysilane coupling agent represented by the formula:

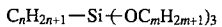

wherein m represents an integer of 1 to 3 and n represents an integer of 4 to 12.

19. The toner according to claim 17, wherein said silane coupling agent is an alkyltrialkoxysilane coupling agent represented by the formula:

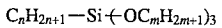

wherein m represents an integer of 1 or 2 and n represents an integer of 6 to 10.

20. The toner according to claim 17, wherein said acidic atmosphere has formic acid, trifluoroacetic acid, propionic acid or a derivative thereof.

21. The toner according to claim 17, wherein said basic atmosphere has ammonia, methylamine, dimethylamine, trimethylamine or a derivative thereof.

22. The toner according to claim 1, wherein said colorant-containing resin particles contain a polyester resin produced by condensation polymerization of i) a diol component comprised of a bisphenol derivative or substituted bisphenol represented by the formula:

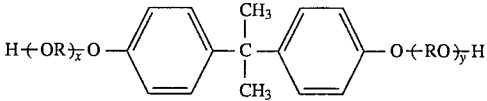

wherein R represents an ethylene group or a propylene group, and x and y each represent an integer of 1 or more, where x+y is 2 to 10, and ii) a carboxylic acid component comprising a dibasic or more basic carboxylic acid, its acid anhydride or its lower alkyl ester.

* * * * *

UNITED STATES PATENT AND TRADEMARK OFFICE
CERTIFICATE OF CORRECTION

PATENT NO. : 5,604,071

DATED : February 18, 1997

INVENTORS : KENJI OKADA ET AL.

Page 1 of 4

It is certified that error appears in the above-identified patent and that said Letters Patent is hereby corrected as shown below:

COLUMN 1

Line 45, "addition" should read --addition,--.

COLUMN 3

Line 17, "can not" should read --cannot--;
Line 44, "full-co/or" should read --full-color--;
Line 58, "general" should read --general,--.

COLUMN 5

Line 18, "methacryl" should read --methacryl--;
Line 20, "γ-methacryloxypropyltrimethoxsilane," should read γ-methacryloxlypropyltrimethoxysilane,--;
Line 21, "vinyltriacethoxsilane," should read --vinyltriacetoxysilane,--,

COLUMN 6

Line 19, "preferably" should read --preferable--;
Lines 32-34  Rewrite lines 32-34 to read as follows: --gaseous phase. This treatment using the coupling agent is carried out in order to block the functional groups of titanium--.

UNITED STATES PATENT AND TRADEMARK OFFICE
CERTIFICATE OF CORRECTION

PATENT NO. : 5,604,071

DATED : February 18, 1997

INVENTORS : KENJI OKADA ET AL.

Page 2 of 4

It is certified that error appears in the above-identified patent and that said Letters Patent is hereby corrected as shown below:

COLUMN 6 continued

Line 40, "moletius" should read --moieties--;
  Line 41, "moletius" should read --moieties--.

COLUMN 8

Line 6, "can not" should read --cannot--;
  Line 24, "a" should read --an--;
  Line 28, "a" should read --an--.

COLUMN 9

Line 12, "agent" should read --Agent--.

COLUMN 10

Line 45, "an" should be deleted.

COLUMN 12

Line 30, "iraconic" should read --itaconic--;
  Line 59, "olafins" should read --olefins--.

UNITED STATES PATENT AND TRADEMARK OFFICE
CERTIFICATE OF CORRECTION

PATENT NO. : 5,604,071

DATED : February 18, 1997

INVENTORS : KENJI OKADA ET AL.

It is certified that error appears in the above-identified patent and that said Letters Patent is hereby corrected as shown below:

<u>COLUMN 13</u>

Line 6, "examle," should read --example--;
  Line 10, "non existence" should read --non-existence--;
  Line 48, "therefore" should read --therefore are--;
  Line 63, "a good" should read --good--.

<u>COLUMN 15</u>

Line 15, "styfane" should read --styrene--;
  Line 16, "preferably" should read --preferably be--.

<u>COLUMN 17</u>

Line 3, "k.k.)" should read --K.K.)--.

<u>COLUMN 18</u>

Line 28, "0.02$\mu$Bm" should read --0.02$\mu$m--.

<u>COLUMN 19</u>

Line 29, "12m$^/$g," should read --12m$^2$/g,--.

<u>COLUMN 22</u>

Line 12, "were" should read --was--.

UNITED STATES PATENT AND TRADEMARK OFFICE
CERTIFICATE OF CORRECTION

PATENT NO.  : 5,604,071

DATED       : February 18, 1997

INVENTORS   : KENJI OKADA ET AL.

It is certified that error appears in the above-identified patent and that said Letters Patent is hereby corrected as shown below:

COLUMN 25

Line 21, "as;" should read --as:--;
Line 61, "120m/g)" should read --120m$^2$/g)--;
Line 62, "Separately" should read --Separately,--.

COLUMN 27

Line 3, "as;" should read --as:--;
Line 63, "50%" should read --50%.--.

Signed and Sealed this

Second Day of September, 1997

Attest:

BRUCE LEHMAN

*Attesting Officer*   Commissioner of Patents and Trademarks